(12) United States Patent  
Richtsmeier (10) Patent No.: US 8,159,697 B2
(45) Date of Patent: Apr. 17, 2012

(54) SYSTEM AND METHOD FOR MONITORING AND CONTROLLING THE DISTRIBUTION OF INFORMATION FROM A MULTI-FUNCTION PERIPHERAL DEVICE

(75) Inventor: Brent Richtsmeier, Laguna Niguel, CA (US)

(73) Assignee: Samsung Electronics Co., Ltd., Suwon, Gyeonggi-Do (KR)

( * ) Notice: Subject to any disclaimer, the term of this patent is extended or adjusted under 35 U.S.C. 154(b) by 1722 days.

(21) Appl. No.: 11/205,948

(22) Filed: Aug. 17, 2005

(65) Prior Publication Data

US 2007/0086041 A1    Apr. 19, 2007

(51) Int. Cl.
  *G06F 3/12*     (2006.01)
  *G06F 13/00*    (2006.01)
  *G06K 15/00*    (2006.01)
  *H04N 1/04*     (2006.01)

(52) U.S. Cl. ...... 358/1.15; 358/474; 358/1.16; 358/523; 711/164

(58) Field of Classification Search ................. 358/1.15, 358/1.16, 1.13, 501, 523, 403, 402, 474; 711/164
See application file for complete search history.

(56) References Cited

U.S. PATENT DOCUMENTS

| | | | |
|---|---|---|---|
| 5,692,111 A | 11/1997 | Marbry et al. | |
| 5,970,218 A | 10/1999 | Mullin et al. | |
| 5,978,454 A * | 11/1999 | King et al. | 379/100.08 |
| 6,160,629 A | 12/2000 | Tang et al. | |
| 6,163,383 A | 12/2000 | Ota et al. | |
| 6,166,826 A | 12/2000 | Yokoyama | |
| 7,379,930 B2 * | 5/2008 | Kasatani | 707/3 |
| 2002/0032703 A1 | 3/2002 | Gassho et al. | |
| 2003/0007177 A1 | 1/2003 | Ferlitsch | |
| 2003/0072031 A1 | 4/2003 | Kuwata et al. | |
| 2004/0049571 A1 * | 3/2004 | Johnson et al. | 709/224 |
| 2005/0072951 A1 | 4/2005 | Alvarez | |
| 2005/0086313 A1 * | 4/2005 | Lucas et al. | 709/206 |
| 2005/0210259 A1 | 9/2005 | Richardson | |

* cited by examiner

*Primary Examiner* — Thomas Lett (57) ABSTRACT

A method and system for tracking and controlling the distribution of information on a networked system. The method includes scanning at least one job on a multi-function peripheral device, sending the at least one job to a destination device, sending the at least one job to a storage remote from the destination device, and storing the at least one job in the storage. In certain embodiments, the storage is at least partially secure from a user.

29 Claims, 3 Drawing Sheets

SYSTEM AND METHOD FOR MONITORING AND CONTROLLING THE DISTRIBUTION OF INFORMATION FROM A MULTI-FUNCTION PERIPHERAL DEVICE

BACKGROUND OF THE INVENTION

1. Field of the Invention

The invention relates to secure distribution of information and more specifically to tracking information transmitted by a multi-function peripheral (MFP) device.

2. Description of the Related Technology

Tracking the distribution of digital information is critical for today's business customer. Before the sharing of digital information became commonplace, document tracking was achieved by logging and tracking an original hardcopy. Tracking hardcopies provided specific control of the information in an office environment. The introduction of multi-function peripheral (MFP) devices in the office has increased the complexity of controlling distribution of this information.

A user may employ a multi-function peripheral device to distribute digital information, for example, send a scanned job to a destination printer, user workstation, or copier. However, the destination location may be not only in the office from where the scanned job originates but may be a location that is remote from the originating office. Likewise, the MFP may receive digital information from local and remote devices. It may be advantageous for today's business customer to track not only digital information leaving and entering the office but also the distribution or dissemination of the digital information within the office.

Today, tracking and logging is done with personal identification numbers ("PIN") and other forms of user authentication. Exemplary methods for controlling digital information include e-mail logging, user authentication, and device logging. However, none of these methods provide a complete solution that meets the needs of today's business customer. For example, e-mail logging as part of an e-mail system only tracks digital information in the form of e-mails. User authentication merely tracks the user of a copier, printer, or other office device but not the scanned, printed, or copied digital information itself. Finally, device logging tracks job information, users, size of digital information, and time but still provides an incomplete picture of the digital information itself to satisfy the needs of today's business customer.

It would be desirable to have a system and method for tracking, or providing selective tracking of, all information transmitted and received by a MFP device. Such an arrangement provides the business owner with a certain level of security needed in today's corporate environment.

SUMMARY OF CERTAIN INVENTIVE ASPECTS

The systems and methods of the present invention have several features, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide several advantages over traditional methods for secure data distribution.

One aspect of the present invention is a method of controlling the distribution of information from a multifunction peripheral on a networked system. The method comprises scanning at least one job on a multi-function peripheral device, sending the at least one job to a destination device, sending the at least one job to a storage remote from the destination device, and storing the at least one job in the storage, wherein the storage is at least partially secure from access by a user.

Another aspect is a method of transferring documents from a first location to a second location and a storage. The method comprises scanning at least one document at a multi-function peripheral device having document transmission capabilities, sending the scanned document to a storage, sending the scanned document to a destination device, accessing the storage, and analyzing the accessed information.

Still another aspect is a system for controlling distribution of information from a multi-function peripheral device. The system comprises a multi-function peripheral device configured to scan and transmit a document, a storage accessible by the multi-function peripheral device and configured to receive and store the transmitted document, at least one printing device configured to receive and print the transmitted document, wherein the storage is located remote from the at least one printing device and stores the scanned document after the at least one printing device prints the scanned document, and a network connecting the multi-function peripheral device to the storage and the at least one printing device.

Yet another aspect is a multi-function peripheral device configured to scan and send a document to storage. The multi-function peripheral device comprises a scanner configured to scan a document, a controller configured to send the scanned document to at least one destination printer and a storage, wherein the storage is located remote from the destination printer, and a control panel configured to receive access information from a user, wherein the access information is transmitted to the storage.

Still yet another aspect is a multi-function peripheral device configured with software to execute the functions of scanning at least one job on a multi-function peripheral device, sending the at least one job to a destination device, sending the at least one job to a storage remote from the destination device, and storing the at least one job in the storage, wherein the storage is at least partially secure from a user.

Another aspect is a multi-function peripheral device that comprising a scanner configured to scan a document, a control panel configured to receive user access information and user instructions associated with the scanned document, wherein the user instructions identify at least one destination printer, and a controller configured to send the scanned document to the identified destination printer(s) and send the scanned document and the access information to a data storage separate from the identified destination printer(s).

Another aspect is a method of controlling the distribution of information from a multi-function peripheral on a networked system. The method comprises scanning at least one job on a multi-function peripheral device, processing the at least one job into a first format and a second format, the first format being different than the second format, and sending the at least one job in the first format to a destination device. The method further comprises sending the at least one job in the second format to a data storage remote from the destination device and storing the at least one job in the data storage, wherein the data storage is at least partially secure from access by a user.

Another aspect is a method of selectively controlling the distribution of information from a multi-function peripheral on a networked system. The method comprises scanning at least one job on a multi-function peripheral device, and receiving user information associated with the at least one job. The method further comprises sending the at least one job to a destination device and determining if security logging is enabled based at least in part on the received user information.

Another aspect is a method of selectively controlling the distribution of information from a multi-function peripheral on a networked system. The method comprises scanning at least one job on a multi-function peripheral device, and selecting a transaction type to associate with the at least one print job. The method further comprises sending the at least one job to a destination device and determining if security logging is enabled based at least in part on the selected transaction type.

DETAILED DESCRIPTION OF CERTAIN EMBODIMENTS

The following description and the accompanying figures, which describe and show certain embodiments, are made to demonstrate several possible configurations that a printing system can take to include various aspects and features of the invention. The illustrations of the systems and methods are not intended to limit the disclosed aspects and features of the invention to the specified embodiments. Those of skill in the art will recognize that the disclosed aspects and features of the invention are not limited to any particular embodiment of an information distribution system.

Multi-function peripheral (MFP) devices have become common in today's office environment. The cost of MFP devices has declined significantly, and the capability of these devices has greatly increased. Today's office environment has become more security aware at the same time that new security requirements, such as Sarbanes Oxley, have become mandatory. These regulations have made security on MFPs a high priority. Embodiments of the invention allow an information technology (IT) administrator to maintain a digital record of any job or transaction completed on the MFP. Exemplary transactions or jobs include copying, scanning, printing, faxing, e-mailing, and the like.

In a network computing environment, MFP devices are often shared among a plurality of users. Different users with physical access to the same MFP device may have different needs, positions, or levels of security. Therefore, it may be desirable to limit or monitor a user's ability to distribute information that may be of a confidential nature. For example, copy jobs of a user are stored while copy jobs of another user are not stored. In certain other embodiments, jobs completed during a specific time of day are stored while jobs completed during another time of day are not stored. For example, jobs completed after work hours or having other suspicious characteristics could be stored. In certain embodiments, the IT administrator selects or enables the monitoring function independently for each of the transaction types. For example, the IT administrator selects one or more transaction types available to the user of the MFP device that include security logging. These transaction types include printing, copying, faxing, e-mailing and the like.

The system and method stores a copy of a job completed on the multi-function peripheral (MFP) device in a storage. The storage may be located on a hard disk in the MFP device or at a location remote from the MFP device. The MFP device may transmit the job to the storage at the remote location via a direct connection or via a network.

In certain embodiments, access to stored jobs in the storage is limited to information technician (IT) administrator. In certain embodiments, a user may access the storage but on a read only basis or with other appropriate security access measures in place. This feature may be advantageous when a user misplaces or otherwise is unable to obtain the original job.

In certain embodiments, a temporary copy of the job is stored in a first storage in the MFP device. The temporary copy may be transferred to a second storage on a network. This transfer may occur periodically or randomly. For example, a periodic transfer could occur at an interval of a day or week. In embodiments where the MFP device has a local storage, the periodic transfer could occur, for example, when the local storage is full. In certain other embodiments, a random transfer occurs in response to predetermined criteria. For example, a copy of a document associated with a specific user or destination are immediately transferred to the second storage. In certain embodiments when such a transfer occurs, the IT administrator is notified to promptly review the document.

In certain embodiment, all of the jobs are not stored in the storage. For example, only scanned jobs could be stored in the storage while fax jobs are not stored in the storage. In certain other embodiments, some jobs are stored in a storage at the MFP device while other types of jobs are stored in a storage remote from the MFP device.

Figure 1:
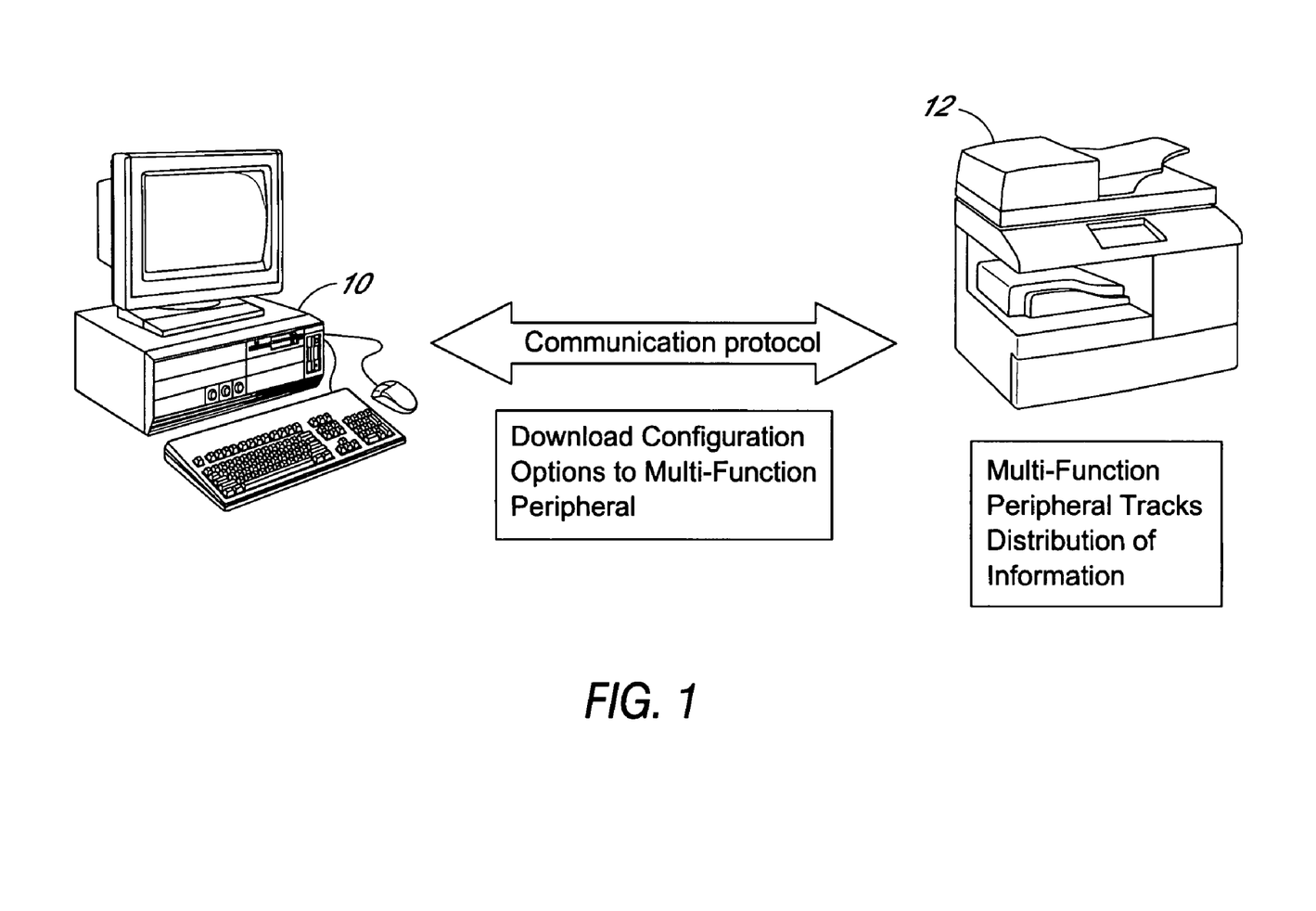
FIG. 1 is a diagram showing an exemplary embodiment of a server computer and a multi-function peripheral configured to track the distribution of digital information.

FIG. 1 is a diagram showing an exemplary embodiment of a server computer 10 and a multi-function peripheral device 12 configured to monitor the distribution of digital information. In certain embodiments, the MFP device 12 disallows specific jobs or transactions. For example, the MFP device 12 may not allow a user to fax to a specific number or fax during a specific time of day.

The server computer 10 may operate using one or more operating systems including, by way of example, Microsoft Windows, Windows 98, Me, 2000, XP, Linux, Red Hat, Caldera, Debian, Mandrake, Slackware, TurboLinux, and SuSE. The server computer 10 is configured to download configuration options associated with the multi-function peripheral device 12. Once downloaded, the multi-function peripheral device 12 monitors a user job according to the downloaded configuration options. In certain embodiments, the MFP device 12 stores a copy of a user job in a storage. In certain embodiments, the MFP device limits the types and times of jobs performed by a user.

The user selects the one or more destination devices for the job. Destination devices include an MFP device, copier, fax machine, workstation, person computer, PDA, and the like.

In certain embodiments, an IT administrator configures a MFP device 12 or a group of MFP devices at the server computer 10. For example in one embodiment, the IT administrator selects one or more configuration options by entering an Internet protocol (IP) address or hostname associated with the selected MFP device 12. Advantageously, the IT administrator may access the server computer 10 once to select configurations options for a group of MFP devices.

In certain embodiments, the multi-function peripheral device 12 communicates with software residing on the server computer 10 to download the configuration options. The software gives the IT administrator the ability to select configuration options at the multi-function peripheral device 12.

The destination device or group of destination devices will typically support one or more printer languages. That is, the multi-function peripheral device 12 is able to transmit the scanned document in a printer language that is compatible with the destination device. The copy of the scanned image or job may be saved to the storage in the same printer language as used for transmission or in a different printer language. In certain embodiments, the scanned job is logged or stored in the storage using a different protocol than the printer language data file sent to the specific destination device. For example, the job could be stored in PDF, Microsoft Word, or other suitable data file type.

In certain embodiments, the MFP device is configured to create an exact copy of the job or information. Creating an exact copy requires an adequate size storage. Adequate system bandwidth may also be necessary to transmit the copy between the MFP device and the storage. For example, an exact copy of an e-mail, fax, copy or other digital image is transmitted to and stored in the storage. These exact copy embodiments may be less efficient for storing copies that include large amounts of data, unlike for e-mails which require less storage.

In certain other embodiments, the MFP device 12 is configured to create a compressed copy of the job or information. Any suitable compression technology including, for example, a special purpose microchip, may be used to perform the compression function. For example, a microchip manufactured by Texas Instruments with JPEG compression or an integrated custom ASIC and a block with JPEG compression provides high rates of lossy compression at high speed. The compression of the job or image could be performed in series or parallel with the standard image transfer process. Once completed, the compressed data is stored in the storage.

In certain other embodiments, a combination of exact copying and compression copying is utilized. The selection of exact or compressed may be based on, for example, the transaction or job type. The transaction or job types include copying, scanning, printing, faxing, e-mailing, and the like. For example, e-mail jobs which often require less storage for their storage are exactly copied while scan jobs which often require more storage than e-mail jobs are compressed. The IT administrator may select whether an exact copy or a compressed copy is made based on the user, nature of the document to be copied, time of day, available storage, and the like.

In certain embodiments, the configuration software is embedded in the multi-function peripheral device 12 and not in the server 10. In this embodiment, the multi-function peripheral device 12 is configured to allow the IT administrator to configure the MFP device 12. A control panel on the multi-function peripheral device 12 allows the IT administrator to interface with the embedded software to configure the MFP device 12.

In certain embodiments, the multi-function peripheral 12 device is a single device configured to perform multiple functions. These functions may include scanning, copying, printing, faxing, and the like. In this way, the multi-function peripheral 12 device is an all-in-one type of device. The multi-function peripheral 12 may print in black and white or in color. In certain embodiments, the multi-function peripheral 12 scans in color and prints in black and white. In certain embodiments, the multi-function peripheral device 12 includes a platen and a controller that controls the operation of the multi-function peripheral device 12. The details of the inner workings of scanning/printing devices are various and well known so they will not be further described.

In certain embodiments, a user enters a code or other unique identifier in to the MFP device 12. For instance, the code could be the last four digits of the user's social security number. The code or unique identifier is used by the MFP device 12 to select a predetermined configuration or determine a configuration to associate with the user's job. The predetermined configuration may be based on the identity of the specific user. The MFP device 12 may rely upon rules to determine a configuration for the user. The MFP device 12 may select a category to associate with the user based on the rules when determining the configuration for the user. These rules may be based on the enterprise role of the user (e.g., manager), the time of day, the destination device, or other characteristic associated with the user or the user's use of the MFP device 12. A database or table mat be configured to store the codes and correlation to of each to an enterprise role or other category. In certain embodiments, the code or unique identifier is associated and stored with the copy.

Figure 2:
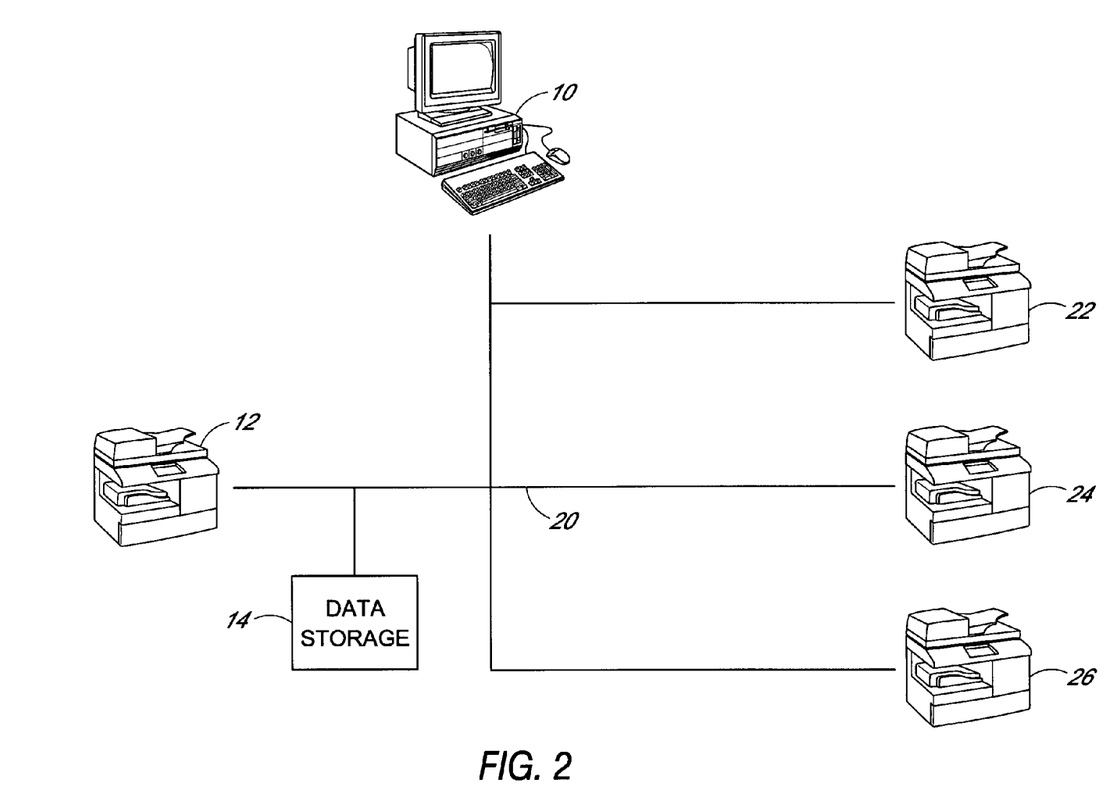
FIG. 2 is a diagram showing a system configured to receive information at the multi-function peripheral device of FIG. 1 and store the received information in a storage.

FIG. 2 is a diagram showing a system configured to receive information from one or more multi-function peripheral devices 12, 22, 24, 26 and store the received information in a data storage 14. The system is configured to control the archival of copies of information or digital data input to one or more MFP devices 12, 22, 24, 26. The system can send a copy of selected or all jobs processed on any of the MFP devices 12, 22, 24, 26 to the storage 14. An IT administrator may access the stored data to monitor or manage the archived or stored copies of the information or digital data. For ease of description, any of the devices 12, 22, 24, 26 will be referred to by reference to 12.

The storage 14 may be in the form of a mass storage device readily accessible to the MFP device's central processing unit (CPU). The mass storage device may be located remote or local to the MFP device 12. The storage 14 is directly connected to the network bus 20 without going through the server computer 10.

While FIG. 2 only illustrates a single storage 14, the storage 14 may be in the form of a plurality of storages. Each storage could be located in a MFP device 12 or remote from one or more of the MFP devices 12. For example, two or more of the MFP devices 12 could include a storage 14. One or more of the storages could receive copies of information from two or more MFP devices 12. An MFP device 12 can store copies received from a different MFP device.

One or more of the MFP devices 12 may be a destination device for a job originating at another MFP device. A network bus 20, which may be of any type suitable, such as Ethernet or Token-Ring, interconnects a number of computers and peripherals. For example, on network 20 there would typically be any number of multi-function peripheral devices 12 configured to originate a first job and subsequently receive a second job from one of the other MFP devices. These devices communicate via one or more technologies that may include, for example, Hi-Speed USB 2.0, IEEE-1284 Parallel (Standard), 10/100 Base-TX, or 802.11b Wireless LAN.

The multi-function peripheral device 12 is a single device that serves several functions, including printing. Multi-function peripheral devices 12 perform at least two functions. The functions may include one or more of the following: printing, scanning, faxing, and photocopying. In certain embodiments, the multi-function peripheral device 12 scans and prints documents. In an embodiment, the multi-function peripheral device 12 uses laser printing technology for printing up to 22 pages per minute. In this embodiment, the multi-function peripheral device 12 has a duty cycle of up to 30,000 pgs/ month, a resolution of up to 1200×1200 dpi, and a cartridge good for printing approximately 5,000 pages (5% coverage). The multi-function peripheral 12 may include a processor having a 166 MHz RISC, and memory of up to 144 MB. This memory may be the same as storage 14 or a different storage.

By way of example, the storage 14 may comprise a random access memory (RAM), static random access memory (SRAM), non-volatile random access memory (NVRAM), dynamic random access memory (DRAM), multi-bank dynamic random access memory (MDRAM), synchronous dynamic random access memory (SDRAM), magnetoresistive random access memory (MRAM), read only memory (ROM), programmable read only memory (PROM), erasable programmable read only memory (EPROM), electrically erasable programmable read only memory (EEPROM), flash memory, hard disk drive, optical disk, and the like.

When configured as printers, the multi-function peripheral devices 12 may have the same or different technology and characteristics for printing text or illustrations on paper. Exemplary technologies include daisy-wheel, dot-matrix, ink-jet, LCD, LED, line printer, and thermal printer. The multi-function peripheral devices 12 may further include one or more of the following characteristics including quality of type (letter, near letter, or draft), speed, impact or non-impact, graphics, and fonts. The multi-function peripheral devices 12 may utilize one or more printer languages including Printer Control Language 6 (PCL) from Hewlett Packard, IBM ProPrinter, Epson, PostScript variants (1, 2, 3), and Printer Job Language (PJL), for example.

The multi-function peripheral device 12 is configured with the desired security, storing, compression, and archiving functions. Once the IT administrator configures the multi-function peripheral devices 12, the security functions are seamless and have no effect on the user's interaction with the multi-function peripheral devices 12. In certain embodiment, the MFP device 12 determines the configurations based at least in part on the user and any rules associated with the user.

In certain embodiments, the system stores, logs, and archives all digital information from one or more MFP devices 12. The system is compatible with multiple types of information. The system advantageously manages the storing and archiving of information at a device level. Once configured, the system is implemented at a user level with minimal oversight by the IT administrator or other company employee.

The storage, archival, and review of the copied or security information may follow a procedure similar to current control and security protocols used for the e-mail system in many corporations. For example, the data stored in the storage 14 could be saved for a predefined period of time, and if required reviewed during that period of time. Alternatively, a maximum size could be specified for the stored or archived information. After reaching the maximum stored size, the oldest information would be overwritten.

In certain embodiments, administrative passwords, device configuration control, and remote access are implemented to enhance overall system security.

Capturing of the information or image could be available in several different options including, exact coping, compression copying, and a mix of exact and compress copying. These configurations may be selected depending on available system resources. For example, exact coping may require a higher level of system performance as well as additional storage to store the copied information.

Figure 3:
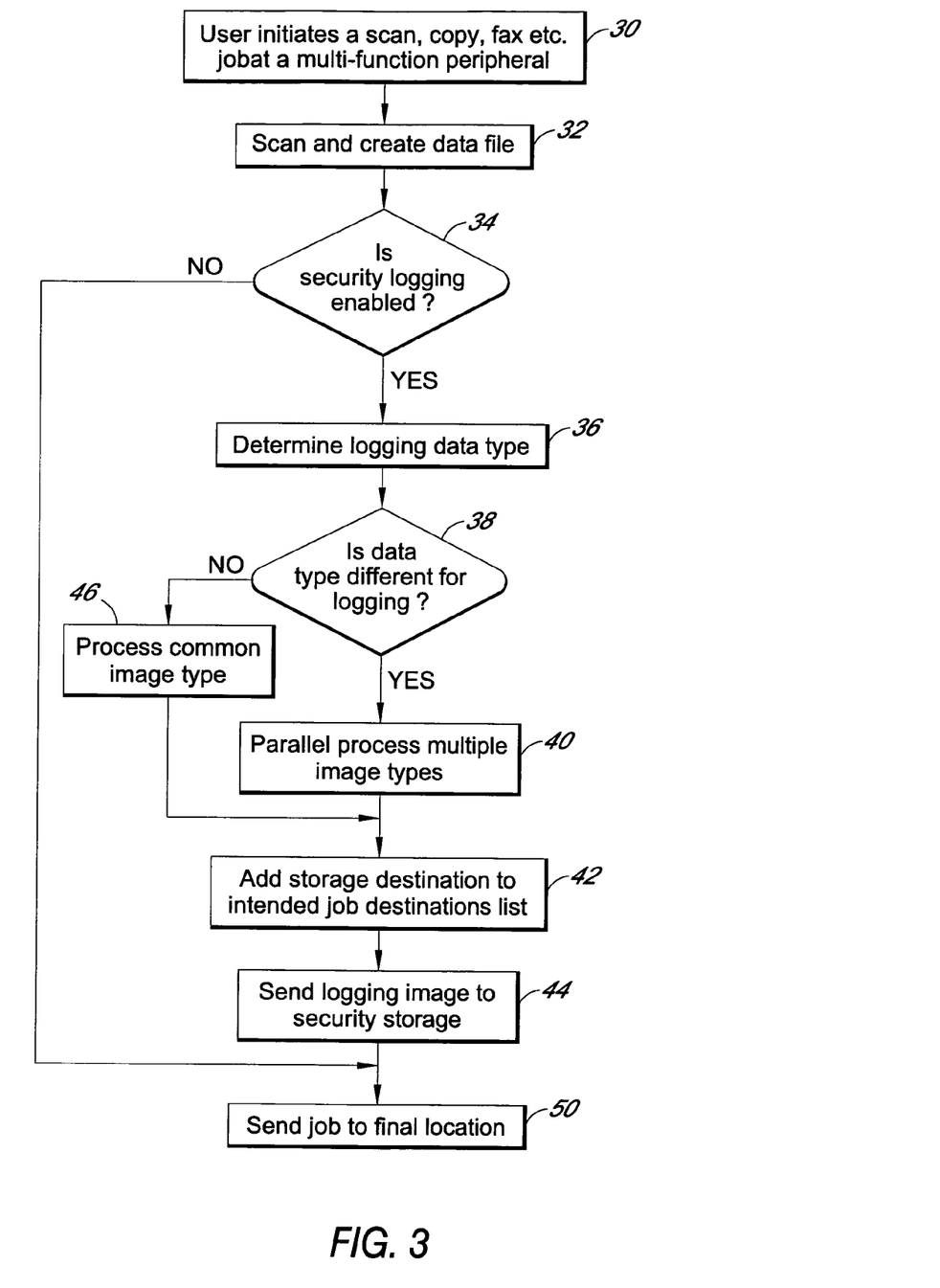
FIG. 3 is a flowchart of one method for receiving information at a multi-function peripheral and storing the received information which may be performed by the system of FIG. 2.

FIG. 3 is a flowchart of one method for receiving information at a multi-function peripheral and storing the received information which may be performed by the system of FIG. 2.

In FIG. 3, depending on circumstances, additional states may be added, others removed, or the order of the states changed. Furthermore, more than two states can be combined into one state.

The method begins at a state 30 where a user initiates a scan, copy, fax, e-mail or the like job at the multi-function peripheral device 12. Next, at a state 32, the MFP device 12 creates a data file for the job. The user may intend to transmit the job to another MFP device 12, a copier, a printer, workstation, or PDA. The user selects the destination device 12 or other device as the job destination. In certain embodiments, an IT administrator creates one or more configurations for a MFP device or a group of MFP devices at the server computer 10. For example in one embodiment, the IT administrator selects one or more configuration options by entering an Internet protocol (IP) address or hostname associated with the selected MFP device. Advantageously, the IT administrator may access the server computer 10 once to select configurations options for a group of MFP devices.

The multi-function peripheral device 12 communicates with software residing on the server computer 10 to download the configuration options. The selected configuration options may be associated with a group 1 of MFP devices, for example. The group 1 may then be selected at one or more MFP devices 12 if the IT administrator intends for those MFP devices 12 to have the same configuration options.

In certain embodiments, configuration software is embedded in the multi-function peripheral device 12 and not in the server 10. In this embodiment, the multi-function peripheral device 12 allows the IT administrator to configure the MFP device 12. A control panel on the multi-function peripheral device 12 allows the IT administrator to interface with the embedded software to configure the MFP device 12.

The destination device or group of destination devices is preferably supported by one or more printer languages. That is, the multi-function peripheral device 12 is able to transmit the data file in a printer language that is compatible with the destination device.

The process moves to a decision state 34 where a determination is made whether the MFP device 12 is configured for security logging. In certain embodiments, the IT administrator has preconfigured the MFP device 12. In certain other embodiments, jobs completed during a specific time of day are stored while jobs completed during another time of day are security logged. For example, jobs completed after work hours or having other suspicious characteristics could be logged. In certain embodiments, the IT administrator selects or enables the monitoring function independently for each of the transaction types. For example, the IT administrator independently selects one or more transaction types available to the user of the MFP device for security logging. These transaction types include printing, copying, faxing, e-mailing and the like.

In certain embodiments, a user enters a code or other unique identifier in to the MFP device 12. The code or unique identifier is used by the MFP device 12 to select a predetermined configuration or to determine a configuration to associate with the user's job. The predetermined configuration may be based on the identity of the specific user.

In certain embodiments, the code is a user ID and PIN. While various embodiments are contemplated, the term "ID" or "PIN" are generally used throughout the description to describe information that uniquely associates a print job with a user.

In certain embodiments, the "ID" or "PIN" has one or more unique characteristics or features for configuring the MFP device 12 for security logging. The level or degree of security logging may be based upon information correlated with the user's "ID" or "PIN". In certain embodiments, the MFP device 12 correlates information from a combination of the "ID" or "PIN" and other sources. For example, biometric data such as voice recognition, thumbprint, retinal print, or facial data could be used together or instead of the ID and PIN. Regardless, depending upon what information the user inputs into the MFP device 12, the MFP device enables or disables security logging for the job initiated by the user associated with the ID and PIN.

Differential security logging for different users serves many purposes. A company or other organization can control distribution of information by granting or denying permissions to a person based upon the information entered into the MFP device 12 or information that is associated with the entered information. For example the ID and PIN can identify a security level or a department code associated with the person assigned to such access information.

In certain embodiments, the MFP device 12 relies upon rules to determine a configuration for the user. The MFP device 12 may select a category to associate with the user based on the rules when determining the configuration for the user. These rules may be based on the work classification of the user, the time of day, the destination device, or other characteristic associated with the user or the user's use of the MFP device 12. These rules may be selected by the IT administrator. In certain embodiments, the code or unique identifier is associated and stored with the copy.

If the MFP device 12 is configured for security logging, the process moves to a state 36 where the logging data type is determined. The logging data type is the data type used to store a copy of the job. The logging data type may be the same or different than the data type used for the data file.

In certain embodiments, the MFP device 12 checks the destination device selected by the user to determine the correct printer language(s). For each destination device, the MFP device 12 checks for the destination printer's driver. The server computer converts the data file into the destination printer's accepted language or format. For example, the MFP device 12 converts the scanned job to PCL for destination device 22 and Postscript for destination device 24.

In certain embodiments, the MFP device is configured to create an exact copy from the data file. Creating an exact copy requires adequate size storage. Adequate system bandwidth may also be necessary to transmit the copy between the MFP device and the storage. For example, an exact copy of an e-mail, fax, copy or other digital image is transmitted and stored in the storage. This embodiment may be less efficient for copies that include large amounts of data, unlike for e-mails which require less storage. In certain embodiments, the MFP device 12 is configured to create a compressed copy of the job or information. The compression of the job or image could be performed in series or parallel with the standard image transfer process. In certain embodiments, a combination of exact copying and compression copying is utilized. The selection of exact or compressed may be based on, for example, the transaction or job type. The transaction or job types include copying, scanning, printing, faxing, e-mailing, and the like. For example, e-mail jobs which often require less storage for their storage are exactly copied while scan jobs which often require more storage than e-mail jobs are compressed. The IT administrator may select whether an exact copy or a compressed copy is made based on the user, nature of the document to be copied, time of day, available storage, and the like.

The process moves to a decision state 38, where a determination is made whether the data type for the data file to be transmitted to the destination device is different than the data type used for the logging data. In certain embodiments, the scanned job is logged or stored in the storage using a different protocol than the destination device. For example, the job is stored in a PDF, Microsoft word, or other data file type while the data file is transmitted to the destination device using PostScript.

If the data type for the copy or logging data is different than the data type for the data file transmitted to the destination device, the process moves to a state 40 where multiple data types are processed by the MFP device 12. In this way, the copy of the scanned image or logging data may be saved to the storage 14 in the same printer language or in a different printer language than the data file sent to the destination device 12.

Next at a state 42, the MFP device 12 adds a storage destination to the intended job destinations list. For example in one embodiment, the IT administrator configures the MFP device 12 by entering an Internet protocol (IP) address or hostname associated with the storage 14 to the list of destinations.

In addition to the storage 14 when security logging is enabled, one or more of the MFP devices 12 receives the job transmitted by the originating MFP device. A network bus 20, which may be of any type known in the art, such as Ethernet or Token-Ring, interconnects a number of computers and peripherals. For example, on network 20 there would typically be any number of multi-function peripheral devices 12 configured to originate or transmit a first job and subsequently receive a second job from one of the other MFP devices. These devices communicate via one or more technologies that may include, for example, Hi-Speed USB 2.0, IEEE-1284 Parallel (Standard), 10/100 Base-TX, or 802.11b Wireless LAN. When security logging is enabled, the data file and logging file are transmitted to two destinations. Of course if the storage 14 is located at the destination device, then both the logging file and the data file are transmitted to the same destination device. More likely, the storage 14 is not located at the destination device 12.

In certain embodiments, additional information is placed in or with the logging file. The additional information may include access information like an ID or PIN. The additional information may be converted to the same language as the logging data or to a different language or format. For example, the logging data could be in PDF format and the additional information associated with the logging data could be in Word format.

The process moves to a state 44, where the copy or logging file is sent to the storage 14. In certain embodiments, the copy is sent in a bitmap or other compressed format. The storage 14 may be located in a server 10 or in one or more MFP devices 12 including the originating MFP device 12.

The process concludes at a state 50 where the job is sent to the destination device 12 and the copy of the job is sent to the storage 14.

Returning to a decision state 38, if the data type is the same as the data type of the data file, the process moves to the state 46 where the MFP device 12 processes the image and data as currently defined. The MFP device 12 processes the logging file and data per the configuration settings. These setting may include, for example, compressing the logging data. The process then continues to state 42 as described above.

Returning to a decision state 34, if security logging is not enabled, then the process moves to the state 50 where the data file is sent to the destination device. A logging file is not sent to storage 14 since security logging is not required.

Of course, it is to be understood that not necessarily all such objectives or advantages may be achieved in accordance with any particular embodiment using the systems and methods described herein. Thus, for example, those skilled in the technology will recognize that the systems may be developed in a manner that achieves or optimizes one advantage or group of advantages as taught herein without necessarily achieving other objectives or advantages as may be taught or suggested herein.

Furthermore, the skilled artisan will recognize the interchangeability of various features from different embodiments. Although these techniques and systems have been disclosed in the context of certain embodiments and examples, it will be understood by those skilled in the art that these techniques and systems may be extended beyond the specifically disclosed embodiments to other embodiments and/or uses and obvious modifications and equivalents thereof. Additionally, it is contemplated that various aspects and features of the invention described can be practiced separately, combined together, or substituted for one another, and that a variety of combination and sub combinations of the features and aspects can be made and still fall within the scope of the invention. Thus, it is intended that the scope of the systems disclosed herein disclosed should not be limited by the particular disclosed embodiments described above.

What is claimed is:

1. A method of controlling the distribution of information from a multi-function peripheral device on a networked system, comprising:
    scanning at least one job on a scanner;
    sending the at least one job and a logging file, the logging file having an entry within a time window, based on a security logging enabled for storing in a destination device; and
    sending the at least one job and the logging file based on the security logging enabled for storing in a data storage, directly connected to a network bus, remote from the destination device.

2. The method of claim 1, wherein the data storage is located at the multi-function peripheral device.

3. The method of claim 1, wherein sending the at least one job includes sending a copy of the at least one job for storing in the data storage located remotely from the multi-function peripheral device.

4. The method of claim 1, wherein the at least one job is associated with access information for conveying the access information to the data storage.

5. The method of claim 4 further comprising receiving the access information for sending to the data storage.

6. The method of claim 4, wherein the access information comprises an identification name associated with an initiator.

7. The method of claim 4, wherein the access information comprises a personal identification number associated with an initiator.

8. The method of claim 1, further comprising converting the at least one job to a printer language.

9. The method of claim 8, wherein the printer language is PCL.

10. The method of claim 8, wherein the printer language is Postscript.

11. A method of transferring documents from a first location to a second location and a data storage, comprising:
    scanning at least one document at a multi-function peripheral device having document transmission capabilities;
    sending the document scanned and a logging file, the logging file having an entry within a time window, based on a security logging enabled for storing in a data storage, the data storage directly connected to a network bus; and
    sending the document scanned and the logging file based on the security logging enabled for storing in a destination device.

12. The method of claim 11, wherein the document scanned is for transmitting via a wireless link.

13. The method of claim 11, wherein the document scanned is for transmitting via a wired link.

14. The method of claim 11, wherein the document is for transmitting through the Internet.

15. A system for controlling distribution of information from a multi-function peripheral device, the system comprising:
    a scanner configured for scanning a document; and
    a controller configured for sending the document and a logging file, the logging file having an entry within a time window, based on a security logging enabled for storing in a data storage.

16. The system of claim 15, wherein the controller for identifying the location of the data storage within the network and to the at least one printing device.

17. A multi-function peripheral device configured to scan and send a document to data storage, the multi-function peripheral device comprising:
    a scanner configured for scanning a document;
    a controller for sending the document scanned and a logging file, the logging file having an entry within a time window, based on a security logging enabled for storing in at least one destination printer and a data storage, wherein the data storage, directly connected to a network bus, is located remote from the destination printer; and
    a control panel configured for receiving access information, wherein the access information is transmitted to the data storage.

18. The multi-function peripheral device of claim 17, wherein the access information comprises a personal identification number associated with an initiator.

19. A multi-function peripheral device configured with software to execute the functions of:
    scanning at least one job on a scanner;
    sending the at least one job and a logging file, the logging file having an entry within a time window, based on a security logging enabled for storing in a destination device; and
    sending the at least one job and the logging file based on the security logging enabled for storing in a data storage, directly connected to a network bus, remote from the destination device.

20. The multi-function peripheral device of claim 19, wherein sending the at least one job includes sending a copy of the at least one job for storing in the data storage located remote from the destination device and continues storing the at least one job scanned after the destination device prints a document scanned.

21. A multi-function peripheral device comprising:
    a scanner for scanning a document;
    a control panel for receiving user access information and instructions associated with the document scanned, wherein the instructions for identifying at least one destination printer; and
    a controller for sending the document scanned and a logging file, the logging file having an entry within a time window, based on a security logging enabled for storing in the destination printer(s) identified and a data storage, directly connected to a network bus, separate from the destination printer(s) identified.

22. A method of controlling the distribution of information from a multi-function peripheral device on a networked system, comprising:

scanning at least one job on a scanner;

processing the at least one job into a first format and a second format, the first format being different than the second format;

sending the at least one job in the first format and a logging file, the logging file having an entry within a time window, based on a security logging enabled for storing in a destination device; and sending the at least one job in the second format and the logging file based on the security logging enabled for storing in a data storage, directly connected to a network bus, remote from the destination device.

23. The method of claim 22, wherein the first format is PCL, and the second format is PDF.

24. A method of selectively controlling the distribution of information from a multi-function peripheral device on a networked system, comprising:

scanning at least one job on a scanner;

receiving initiator information;

sending the at least one job and a logging file, the logging file having an entry within a time window, based on a security logging enabled for storing in a destination device; and sending the at least one job and the logging file based on the security logging enabled for storing in a data storage, the data storage directly connected to a network bus, remote from the destination device.

25. The method of claim 24, wherein the initiator information is at least a portion of a social security number.

26. The method of claim 24, wherein the initiator information is a PIN.

27. A method of selectively controlling the distribution of information from a multi-function peripheral device on a networked system, comprising:

scanning at least one job on a scanner;

selecting a transaction type for associating with the at least one print job;

sending the at least one job and a logging file, the logging file having an entry within a time window, based on a security logging enabled for storing in a destination device; and sending the at least one job and the logging file based on the security logging enabled for storing in a data storage, the data storage directly connected to a network bus, remote from the destination device.

28. The method of claim 27, wherein the transaction type is copying.

29. The method of claim 27, wherein the transaction type is faxing.

* * * * *